Nov. 17, 1964  G. S. MITTELSTAEDT  3,157,172
OZONIZING MEANS IN COMBUSTION ENGINES
Filed May 16, 1963  2 Sheets-Sheet 1

INVENTOR.
George Mittelstaedt

Nov. 17, 1964 G. S. MITTELSTAEDT 3,157,172
OZONIZING MEANS IN COMBUSTION ENGINES
Filed May 16, 1963 2 Sheets-Sheet 2
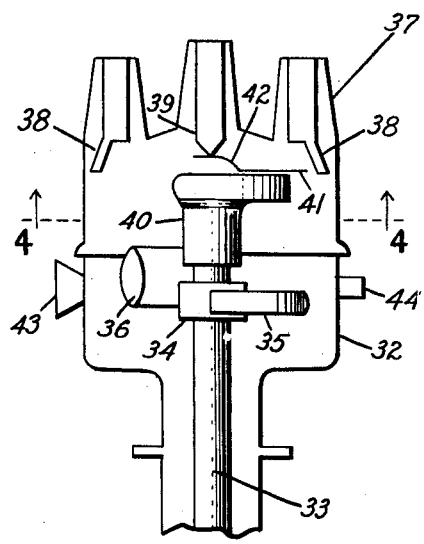
FIG.3
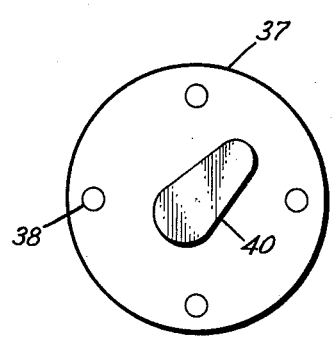
FIG.4
FIG.5
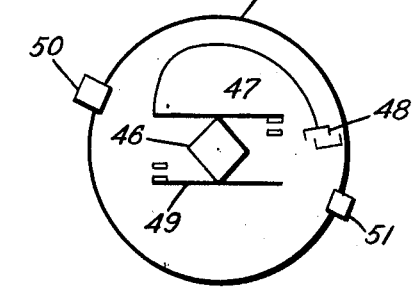
FIG.6
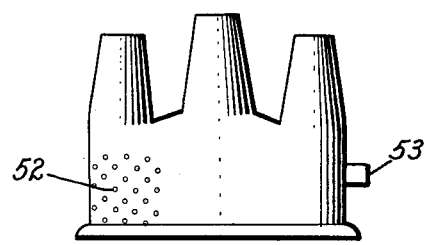
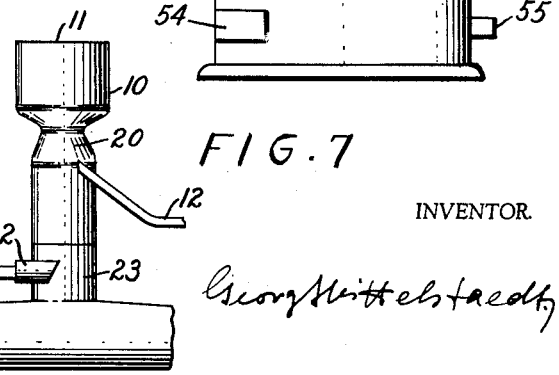
FIG.1B
FIG.7
INVENTOR.
George Mittelstaedt

United States Patent Office 3,157,172
Patented Nov. 17, 1964

3,157,172
OZONIZING MEANS IN COMBUSTION ENGINES
Georg S. Mittelstaedt, 274 73rd St., Brooklyn, N.Y.
Filed May 16, 1963, Ser. No. 280,911
15 Claims. (Cl. 123—119)

This invention relates to internal combustion engines having distributors, and to ozone in connection therewith. It relates to methods and apparatus for producing a current of air through the distributor, and ozonizing the air current therein, for use in the intake, combustion, and/or exhaust zones of the combustion engine.

In the text and claims, by "ozonizing" is meant converting some of the oxygen in the air into ozone; mixing or combining with ozone or ozonized air; or forming ozonides.

The ozonized air is introduced into the intake line of the engine for ozonizing intake air, fuel, or a mixture thereof, to enrich and improve the charge, for promoting combustion, to increase the efficiency of the engine, and/or to economize on fuel.

The ozonized air may also be introduced directly into the cylinders of the engine, or it may be introduced into the exhaust line of the engine, which may include an afterburner zone, to ozonize the combustion products, to purify or neutralize the combustion gases, to use up excess oxygen and other unburned exhaust gases, to burn ozone in afterburners, to use ozonized air in afterburners, to increase the efficiency of afterburners.

Other objects are simplicity, low cost, relative ease and simplicity of installation, and ease of maintenance.

These and other objects will become apparent in the description below, in which characters of reference refer to like-named parts in the drawing.

The drawing shows sectional and plan views illustrating the application of the invention, but the invention is not limited to the particular examples illustrated.

A large class of piston-type engines, including automobile and aircraft engines, operate on a premixed charge of fuel vapor and air. In these and in other engines the charge is ignited by passing a high-voltage electric current between two electrodes in the combustion chamber.

The usual ignition system essentially comprises a battery, an ignition switch, an ignition coil, and a distributor, and the principle is well known.

The present invention particularly relates to the distributor as related to ozonizing.

Basically, the distributor comprises a drive shaft, a breaker cam thereon for operating a contact breaker, a condenser for preventing an arc across the breaker points, a rotor over the breaker cam, a distributor base, and a cap provided with high tension terminals.

The distributor directs the secondary current from the induction coil to the various spark plugs of the multi-cylinder engine in their proper firing order.

The high-tension ignition current suitable for use by spark plugs is delivered to the distributor at its revolving switch arm or rotor. Around the periphery of the travel of this arm or rotor are mounted high-tension terminals which are connected to the various circuits to which the current is to be distributed, and there are as many terminals as there are spark plugs. The rotation of the distributor arm brings it successively opposite the high-tension terminals. There may be actual contact between the distributor arm and the terminals, but the current is usually required to jump a gap between them. The voltage must be high enough to do this.

The distributor arm is mounted on a rotating shaft driven from the crankshaft. In the four-cycle engine this shaft revolves at one-half crankshaft speed. In the two-cycle engine it revolves at crankshaft speed.

Instead of the battery system, the well known magneto system may be used, in which the voltage required to cause flow of current in the primary winding of the ignition coil is generated by the rotation of a set of permanent magnets, instead of being supplied by a battery.

Also, any other source of electricity may be utilized, e.g. piezo type high voltage generators, in which a cam or other means presses a crystal or other suitable material for producing an electric discharge.

Spark plug ignition in regular firing order, as above described, is the primary function of the distributor; but the distributor produces a high-tension electric discharge between the rotating distributor arm and the successively opposite high-tension terminals, and I discovered that this high-tension discharge is suitable for ozonizing a current of air which is passed through the distributor. Therefore, in this invention, I force a current of air through a distributor, and the electric discharge in the distributor effects the change $3O_2 = 2O_3$, converting some of the oxygen in the current of air into ozone.

It is well known that ozone is formed when air is subjected to electrostatic discharge, that is, to any type of silent, arcing or sparking electric discharge; and ozone is formed when a current of air is passed through any high-voltage, alternating current electric discharge, or when electric sparks flash, as in an electric motor.

Ozone has many unusual properties which make it useful in this invention. Ozone is itself not a fuel but is a supporter of combustion. Ozone has three atoms of oxygen in each molecule, in contrast to oxygen which has two atoms of oxygen in each molecule. This third atom of oxygen is not held tightly by the other two. It splits off easily and combines with the etheral oils, nitrogen, olefin compounds, unsaturated organic compounds, and many other substances and compounds, forming characteristic ozonides. In some ozonides four oxygen atoms are taken up, and in the text and claims, the term ozonides includes these species. Ozone unites vigorously with other things such as dirt, soot, combustion products etc. Ozone is an active chemical, well suited for the stated purposes.

Referring briefly to the drawing, FIGURE 1 is a plan view of a distributor-ozonizer in connection with the intake line of a combustion engine.

FIGURE 3 is a cross-section through a distributor-ozonizer showing the air inlet and the outlet.

FIGURE 4 is a transverse view taken on the line 4—4 of FIGURE 3.

FIGURE 5 is a top plan view of a modified distributor, with the head removed.

FIGURE 6 shows air-intake perforations in a distributor head.

FIGURE 7 shows an air intake opening flush with the distributor head.

Figure 1:
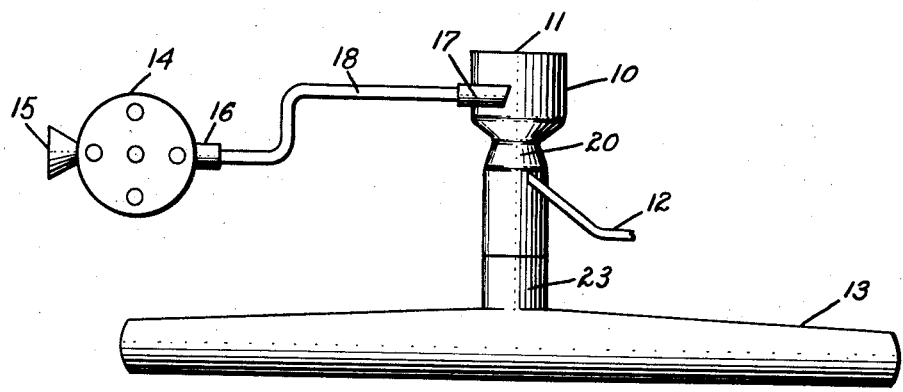
FIGURE 1A is a modification of FIG. 1.
FIGURE 1B also is a modification of FIG. 1.

Referring in detail to the drawing, the numeral 10 in FIGURE 1 indicates a carburator with an air inlet 11 and a fuel jet 12, connected to the intake manifold 13 of a piston-type combustion engine, not shown. The numeral 14 indicates a distributor. On one side of the distributor is an air inlet 15, expanding outward, and on the opposite side is an outlet 16. The outlet 16 is smaller in diameter than the greatest diameter of the air inlet 15. The numeral 17 indicates a suction tube extending into the air inlet of the carburator, and 18 indicates a tube connecting the outlet 16 from the distributor to the suction tube 17.

In this arrangement the intake of the pistons within the cylinders of the engine will cause a draft through the intake line and carburetor, and the suction tube 17 and tube 18 will draw air through the distributor, in which the air stream will be acted upon by the electric discharge and will be ozonized.

The ozonized air is drawn through the tubes 17 and 18 out of the distributor and into the carburetor, and from there into the cylinders. In the carburetor, the ozonized air will enrich the air-fuel mixture and will produce a highly combustible vapor, which will increase the efficiency of the engine.

Figure 1A:
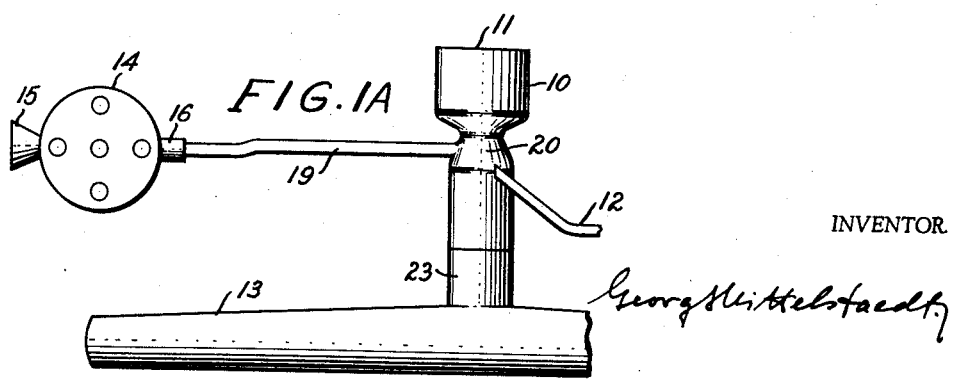

In FIGURE 1A, the line 19 indicates a tube leading from the distributor outlet 16 to the venturi 20 of the carburetor, and opening into the venturi immediately downstream of its throat, for drawing ozonized air into the carburetor. In FIGURE 1B, the line 21 indicates a tube leading from the distributor outlet 16 to the suction tube 22 extending into the intake zone 23 of the manifold 13, for ozonizing the air and fuel mixture.

The line from the outlet 16 of the distributor may be connected to any part of the intake line, also without entering, and may be connected to several parts thereof. For instance, the line may use the low pressure in the carburetor venturi and the intake manifold to produce the proper suction.

The line from the distributor outlet 16 preferably connects to the intake line of the engine upstream of the throttle valve, e.g. as illustrated at 18-17 in FIGURE 1, thereby preventing too lean a mixture during light load and idling operations.

The invention essentially comprises forcing air through a distributor and ozonizing the air stream in the distributor, for use in the combustion engine, and any means to this end may be utilized.

It must be understood that any pump or means may be utilized to force a current of air through a distributor, and force the ozonized air from the distributor into the intake zone, the combustion zone, or the exhaust zone of the combustion engine.

In the text and claims, by "intake line" is meant any part thereof between air intake and cylinders; by "exhaust line" is meant any part thereof between the cylinders and the end of the exhaust line.

Figure 2:
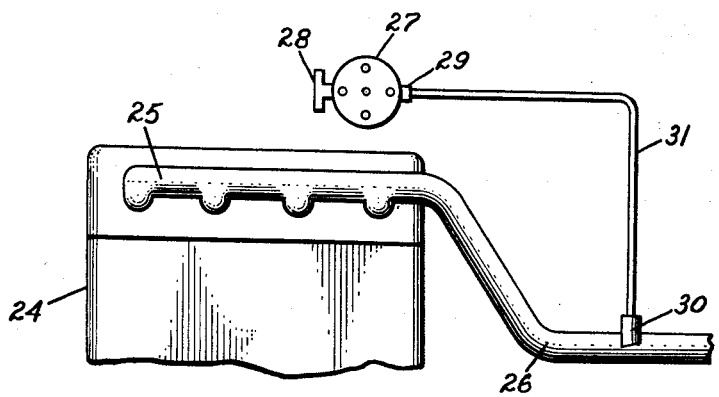
FIGURE 2 is a plan view of a distributor-ozonizer in connection with the exhaust line of a combustion engine.

In FIGURE 2, the numeral 24 indicates a piston type combustion engine, having an exhaust manifold 25 and an exhaust tube 26. The numeral 27 indicates a distributor. On one side of the distributor is an air inlet 28, expanded at the outer end, and on the opposite side of the distributor is an outlet 29. The outlet 29 is smaller in diameter than the greatest diameter of the air inlet 28. It is to be noted that in this invention the distributor inlet and outlet do not have to be opposite, but may be placed in any suitable position. The numeral 30 indicates a suction tube extending into the exhaust tube 26, and 31 indicates a tube connecting the outlet 29 of the distributor to the suction tube 30.

The suction tube 30 produces a low pressure area which will cause a draft of air through the distributor 27, in which the air stream will be acted upon by the electric discharge, and will be ozonized.

The ozonized air is drawn through the tubes 30 and 31 of the distributor and into the exhaust tube, where it will ozonize the exhaust. The suction tube 30 may be disposed in any part of the exhaust line; or any other means may be provided in the exhaust line, perhaps a venturi, for producing a low pressure area, to draw ozonized air from the distributor outlet into the exhaust line.

The line 31 from the distributor outlet 29 may be connected to any part of the exhaust line, and may be connected to several parts thereof to produce the proper results. If the line 31 is connected to the afterburner zone, the ozonized air will aid combustion and tend to increase thrust, which is important in connection with airplanes. If the line 31 is connected to a portion of the exhaust tube downstream of the combustion zone, then the ozonized air will primarily purify and/or neutralize the exhaust gases.

Of course, as stated above, any type pump or any other means may be utilized to force a current of air through the distributor, and to force the ozonized air from the distributor into the exhaust line of the combustion engine.

FIGURE 3 is a longitudinal cross-section of a distributor, showing an application of the invention. Here the numeral 32 indicates the distributor base, and 33 indicates the drive shaft. The numeral 34 indicates the breaker cam for operating contact breaker 35, and 36 shows a condenser for preventing an arc across the breaker points, not shown. The distributor cap 37 has a series of high-tension terminals 38 placed in a circle around a central high-tension terminal 39. A rotor 40 is mounted on the breaker cam 34 under the cap and rotates with the cam. As it rotates, a metal segment 41 in the rotor sweeps past the outer high-tension terminals 38. The metal segment 41 is connected by a spring 42 to the center high-tension terminal 39. Therefore, the rotor 40 connects the center terminal 39 to the outer terminals 38, one after the other, as it turns, and the rotor is successively opposite the outer high-tension terminals for effecting a high voltage discharge. The numeral 43 indicates a conical air inlet in the distributor base, and 44 indicates an outlet from the base which will be connected to the intake and/or exhaust lines of the combustion engine.

In operation, an air current is passed through the distributor and is ozonized therein by the high voltage electric discharge, for use in the combustion engine. It can also be seen that the rotor 40 will act to mix and compress the air passing through the distributor, thereby providing more uniform ozonizing, and tending to increase the yield of ozone.

FIGURE 4 is a transverse view taken on line 4—4 of FIGURE 3. Again, the numeral 37 indicates the distributor cap, 38 shows the outer high-tension terminals, and 40 indicates the rotor. As it rotates, high-tension ozonizing discharges are effected between the metal segment at the end of the rotor arm and successive outer high-tension terminals.

FIGURE 5 is a top plan view of a distributor with the cap removed, illustrating a modification of the device. Here the numeral 45 indicates the distributor base, 46 the breaker cam, 47 the contact breaker, and 48 the condenser, as is usual. But in this modification there is an extra contact breaker 49 operated by the same breaker cam 46. This contact breaker 49 is connected to the battery and is designed to produce an arc across its breaker points, for further increasing the ozonizing effect. The numeral 50 indicates an air inlet in the distributor base and 51 shows the outlet, the air inlet being greater in diameter than the outlet.

FIGURE 6 shows a distributor cap in which the air inlet consists of perforations 52. All or part of the cap may be perforated. The numeral 53 indicates the outlet.

FIGURE 7 shows a distributor cap in which the air inlet is an opening 54 which is substantially flush with the cap.

Air inlets as shown in FIGURES 6 and 7 may also be disposed in the distributor base, in both base and cap, or they may be arranged partly in the base and partly in the cap, or therebetween.

The described air current through the distributor also acts as cooling means for the distributor, and this is part of the present invention.

It is to be understood that fuel injection or any other fuel system may be used in connection with the described distributor-ozonizer, and this forms part of this invention.

It is to be noted that the devices and features illustrated and described are interchangeable.

The drawings and description are illustrative and explanatory only, and the invention is not limited thereto, and various changes may be made without departing form the spirit or scope of the invention.

In the text and claims, by "tube" is also meant duct, channel, passage, line; by "suction tube" is meant any tube which produces suction, and/or which conveys suction flow, also in part; by "suction line" is meant a tube leading to a suction tube or other low pressure area, or which produces suction; by "combustion line" is meant intake, combustion and exhaust zones of the engine; by "inlet" is meant tube, duct, opening, slits, perforations, pores, or any other means of ingress; by "outlet" is meant tube, duct, opening, vent, or any other means of egress.

The principles involved in this invention may be applied to all fields of combustion as related to the type of ozonator described.

I claim:

1. In a multicylinder combustion engine having an intake line, a combustion zone, an exhaust line, and an ignition system including a distributor which comprises a base, a driveshaft, a breaker cam on the driveshaft operating a primary-circuit breaker, a condenser, a rotor mounted on the driveshaft over the breaker cam, a cap disposed on the distributor base, a series of high-tension terminals in the cap placed in a circle around a central high-tension terminal, a metal segment in the rotor arm sweeping past the outer high-tension terminals, and means connecting said segment to the center high-tension terminal, an air inlet and an outlet in the distributor, a connecting tube leading from said outlet to the exhaust line of the engine, and means producing flow through said inlet into the distributor, through said outlet out of the distributor, and through the connecting tube into the exhaust line of the combustion engine.

2. In a multicylinder combustion engine having an intake line, a combustion zone, an exhaust line, an ignition system including a distributor directing the ignition current to the various spark plugs of the engine in their proper firing order, an inlet into the distributor, and an outlet from the distributor, means connecting said outlet to the exhaust line of the engine.

3. In a multicylinder combustion engine comprising a combustion line, an ignition system including a distributor with a breaker cam and a contact breaker and directing the ignition current to the various spark plugs of the engine in their proper firing order, an inlet and an outlet in the distributor, and means connecting said outlet to the combustion line, an extra contact breaker independent of spark plug ignition disposed in the distributor and operated by said same breaker cam, for producing additional ozone in the distributor for use in the combustion line of the engine.

4. In a multicylinder combustion engine comprising a combustion line, an ignition system including a distributor directing the ignition current to the various spark plugs of the engine in their proper firing order, an inlet and an outlet in the distributor, and means connecting said outlet to the combustion line, electric discharge means independent of spark plug ignition disposed in the distributor for producing additional ozone for use in the combustion line of the engine.

5. In a multicylinder combustion engine comprising an intake line, a combustion zone, an exhaust line, an ignition system including a distributor having a breaker cam and a contact breaker and directing the ignition current to the various spark plugs of the engine in their proper firing order, an inlet and an outlet in the distributor, a tube leading from said outlet to the intake line of the engine, and means producing flow through said inlet into the distributor, through said outlet out of the distributor, and through said tube into the intake line of the engine, the flow being ozonized by the high-tension discharge in the distributor, an extra contact breaker independent of spark plug ignition mounted in the distributor and operated by said same breaker cam, producing an electrical discharge between its breaker points and increasing the yield of ozone in the distributor.

6. In a multicylinder combustion engine having a combustion line, an ignition system including a distributor directing the ignition current to the various spark plugs of the engine in their proper firing order, an inlet and an outlet in the distributor, and a tube leading from said outlet to the combustion line of the engine, the improvement consisting in that the tube from the distributor outlet extends into and within the combustion line, thereby producing a low pressure area at the aspiration point.

7. In a multicylinder combustion engine having a combustion line, an ignition system including a distributor directing the ignition current to the various spark plugs of the engine in their proper firing order, an inlet and an outlet in the distributor, and means restricting the combustion line thereby producing a low pressure area therein, a tube leading from the distributor outlet to the restricted low pressure area.

8. In a multicylinder combustion engine having an intake line, a combustion zone, an exhaust line, an ignition system including a distributor directing the ignition current to the various spark plugs of the engine in their proper firing order, an inlet into the distributor, and an outlet from the distributor connected with the intake line of the engine, the improvement consisting in that said inlet into the distributor is subjected to pressure greater than the static pressure in the intake line of the engine.

9. In a multicylinder combustion engine having a combustion line, an ignition system including a distributor directing the ignition current to the various spark plugs of the engine in their proper firing order, an inlet into the distributor, an outlet from the distributor, a tube leading from said outlet to the combustion line of the engine, and means producing flow through said inlet into the distributor, through said outlet out of the distributor, and through said tube into the combustion line of the engine, the improvement consisting in that said inlet into the distributor is subjected to at least atmospheric pressure; said flow being ozonized by the electrical discharge in the distributor, for use in the combustion line.

10. In a multicylinder combustion engine having a combustion line, an ignition system including a distributor directing the ignition current to the various spark plugs of the engine in their proper firing order, an inlet in the distributor, and an outlet from the distributor connected to the combustion line of the engine, an inlet enlargement on the distributor subjected to atmospheric pressure.

11. In a multicylinder combustion engine comprising an intake line including a throttle valve, a combustion zone, an exhaust line, an ignition system including a distributor directing the ignition current to the various spark plugs of the engine in their proper firing order and an inlet into the distributor subjected to pressure greater than the static pressure in the intake line of the engine, an outlet from the distributor connected with the intake line of the engine upstream of the throttle valve.

12. In a multicylinder combustion engine comprising an intake line including a carburator equipped with valves, a combustion zone, an exhaust line, an ignition system including a distributor directing the ignition current to the various spark plugs of the engine in their proper firing order, and an inlet into the distributor subjected to atmospheric pressure, an outlet from the distributor connected with the intake line of the engine at a point upstream of the carburator valves.

13. In a multicylinder combustion engine comprising an intake line including a throttle valve, a combustion zone, an exhaust line, an ignition system including a distributor directing the ignition current to the various spark plugs of the engine in their proper firing order, an inlet into the distributor subjected to at least atmospheric pressure and an outlet from the distributor, the improvement consisting in that said outlet is connected to the intake line of the engine outwardly of the throttle valve.

14. In a multicylinder combustion engine comprising an intake line, a combustion zone, an exhaust line, an ignition system including a distributor having a breaker cam and a contact breaker and directing the ignition current to the various spark plugs of the engine in their proper firing order, an inlet and an outlet in the distributor, a tube leading from said outlet to the exhaust line of the engine, and means producing a flow through said inlet into the distributor, through said outlet out of the distributor, and through said tube into the exhaust line of the engine, the flow being ozonized by the high-tension discharge in the distributor, an extra contact breaker independent of spark plug ignition mounted in the distributor and operated by said same breaker cam, producing an electrical discharge between its breaker points and increasing the yield of ozone in the distributor.

15. In a multicylinder combustion engine having an intake line, a combustion zone, an exhaust line and an ignition system including a distributor directing the ignition current to the various spark plugs of the engine in their proper firing order, an inlet and an outlet in the distributor, a connecting tube leading from said outlet to the exhaust line of the engine, and means producing flow through said inlet into the distributor, through said outlet out of the distributor, and through said connecting tube into the exhaust line of the combustion engine.

References Cited by the Examiner
UNITED STATES PATENTS

| | | | |
|---|---|---|---|
| 1,778,036 | 10/30 | Noble | 123—119 |
| 1,813,808 | 7/31 | Kuehn. | |
| 1,982,484 | 11/34 | Runge | 123—119 |
| 2,149,516 | 3/39 | Flamm | 123—198 |
| 2,207,368 | 7/40 | Arthur | 200—19 |
| 2,251,387 | 8/41 | Arthur | 200—19 |
| 2,634,341 | 4/53 | Rosen | 200—19 |
| 2,798,471 | 7/57 | Kiekhaefer | 123—41.31 |

RICHARD B. WILKINSON, *Primary Examiner.*

KARL J. ALBRECHT, *Examiner.*